United States Patent
Wendt et al.

(10) Patent No.: US 11,674,428 B2
(45) Date of Patent: Jun. 13, 2023

(54) METHOD FOR DETECTING A MANIPULATION OF AN EXHAUST GAS SYSTEM AND CONTROL UNIT AND CHECKING UNIT

(71) Applicant: Robert Bosch GmbH, Stuttgart (DE)

(72) Inventors: Hauke Wendt, Ditzingen (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/656,607

(22) Filed: Mar. 25, 2022

(65) Prior Publication Data
US 2022/0325650 A1     Oct. 13, 2022

(30) Foreign Application Priority Data

Mar. 30, 2021    (DE) .................... 10 2021 203 233.8

(51) Int. Cl.
| | |
|---|---|
| *F01N 11/00* | (2006.01) |
| *G07C 5/10* | (2006.01) |
| *G05B 23/02* | (2006.01) |
| *G07C 5/00* | (2006.01) |
| *F01N 3/20* | (2006.01) |

(52) U.S. Cl.
CPC .......... *F01N 11/00* (2013.01); *G05B 23/0243* (2013.01); *G07C 5/008* (2013.01); *G07C 5/10* (2013.01); *F01N 3/208* (2013.01); *F01N 2900/0422* (2013.01)

(58) Field of Classification Search
CPC .. F01N 11/00; F01N 3/208; F01N 2900/0422; F01N 2900/04; F01N 2900/06; F01N 11/002; F01N 2560/026; F01N 2560/06; F01N 2560/07; G05B 23/0243; G05B 19/0428; G07C 5/008; G07C 5/10
See application file for complete search history.

(56) References Cited

U.S. PATENT DOCUMENTS

2009/0293457 A1    12/2009   Grichnik et al.

FOREIGN PATENT DOCUMENTS

| DE | 10 2014 209 551 A1 | 11/2015 | |
|---|---|---|---|
| DE | 102014209551 A1 * | 11/2015 | .............. F01N 11/00 |
| DE | 10 2018 221 441 A1 | 6/2020 | |

OTHER PUBLICATIONS

Machine Translation of DE-102014209551-A1 (Year: 2015).*

* cited by examiner

*Primary Examiner* — Brandon D Lee
(74) *Attorney, Agent, or Firm* — Maginot, Moore & Beck LLP

(57) ABSTRACT

A method detects a manipulation of an exhaust gas system, in which measured values are sent to an external checking unit by a control unit of the exhaust gas system. In the external checking unit, an evaluation of the exhaust gas system as "manipulated" or as "not manipulated" takes place. Model values are formed in the control unit, which are at least partially formed from the measured values which are sent to the external checking unit. The external checking unit takes the model values and the measured values into consideration in the evaluation of the exhaust gas system.

7 Claims, 2 Drawing Sheets

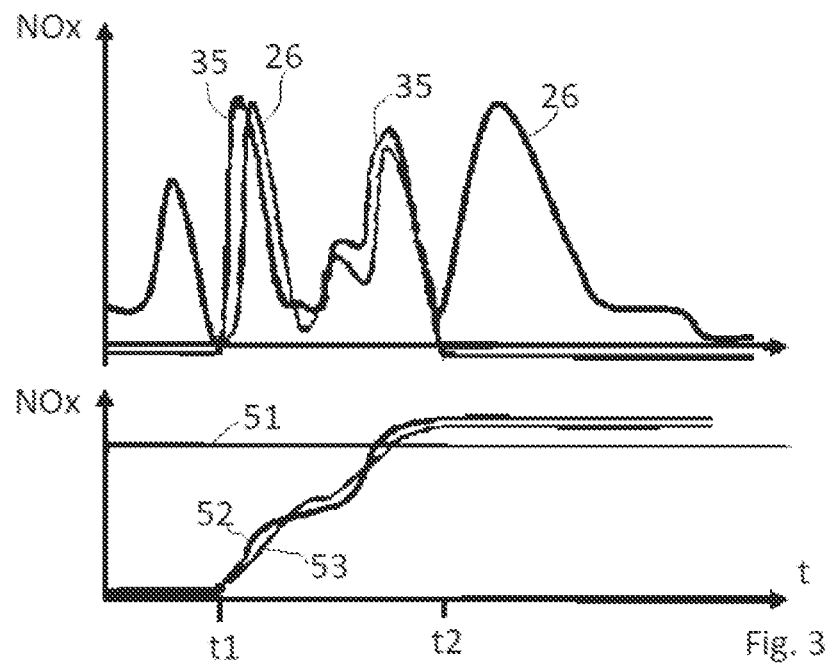
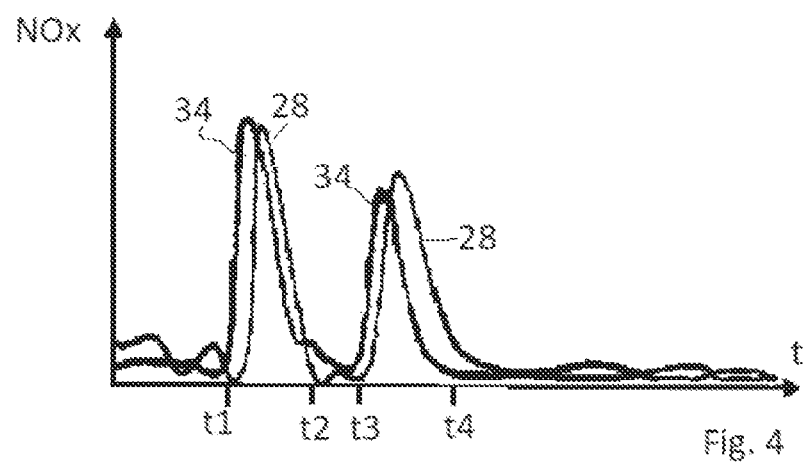

METHOD FOR DETECTING A MANIPULATION OF AN EXHAUST GAS SYSTEM AND CONTROL UNIT AND CHECKING UNIT

This application claims priority under 35 U.S.C. § 119 to patent application no. DE 10 2021 203 233.8, filed on Mar. 30, 2021 in Germany, the disclosure of which is incorporated herein by reference in its entirety.

The disclosure is directed to a method for detecting a manipulation of an exhaust gas system or a control unit or a checking unit.

BACKGROUND

A method for detecting a manipulation of an exhaust gas system is already known from DE 10 2018 221 441, in which measured values of an exhaust gas system are sent by a control unit of the exhaust gas system to an external checking unit. In the checking unit, the exhaust gas system is then evaluated as "manipulated" or as "not manipulated". The external checking unit can carry out more complex calculations than the control unit of the exhaust gas system in order to detect a manipulation of the exhaust gas system. In particular, the external checking unit can evaluate a time curve.

SUMMARY

The method according to the disclosure or the control unit or checking unit having the features of the independent claims have the advantage over this that an improved check of the exhaust gas system with respect to a manipulation can be carried out. Furthermore, it is made significantly more difficult for an attacker who wishes to manipulate the exhaust gas system to conceal the manipulation, due to increased effort in the manipulation. In particular, complex manipulation devices are reliably prevented by the measures disclosed herein. The checking of the exhaust gas system with respect to manipulations is thus overall significantly improved.

Further advantages and improvements result by way of the features of the dependent claims. The model values which are sent to the external checking unit can in particular be the model values which are used in any case in an internal onboard diagnosis (OBD). Therefore, separate calculations of the model values to be transferred do not have to take place. Due to the transfer of additional items of information with respect to the reliability of the model values, in particular operating states of the exhaust gas system can be excluded which do not enable reasonable modeling. These are in particular operating states in which the exhaust gas system is operated very dynamically or if thermal equilibrium was not yet reached in the exhaust gas system. Due to the transfer of intermediate values, it can be made even more difficult to manipulate the exhaust gas system. Since these intermediate values are only sent for the purpose of the diagnosis by the checking unit, it is difficult for an attacker who wishes to manipulate the exhaust gas system to recognize the actual significance of these intermediate values. Furthermore, the manipulation attempts can also be made more difficult in that the model values are encrypted before they are sent. Since the model values are not required by any further controller outside the control unit and checking unit, end-to-end encryption can be carried out here without problems. Simple encryption can also be carried out in that the model values are only transferred at predetermined points in time or in dependence on predetermined events. Furthermore, the external checking unit can also give instructions to the control unit for how the model values to be sent are formed. New model values for the transfer from the control unit to the checking unit may thus also be defined from time to time. Furthermore, active interventions in the exhaust gas system can also take place. If these active interventions only take place very rarely or are triggered by the external checking unit, it is very difficult for an attacker to understand this procedure and accordingly to bypass it by a manipulation.

BRIEF DESCRIPTION OF THE DRAWINGS

The method according to the disclosure, the control unit, and the checking unit are illustrated in the drawings and explained in the following description.

In the figures:

FIG. 3 shows a measured value and a model value in the time curve, and FIG. 4 shows a measured value and a model value in the time curve.

DETAILED DESCRIPTION

Figure 1:
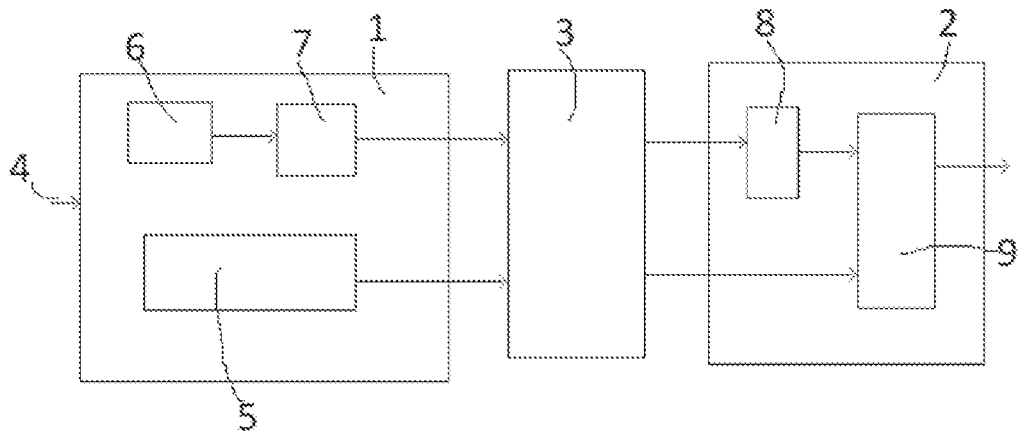
FIG. 1 shows a control unit and an external checking unit.
Figure 2:
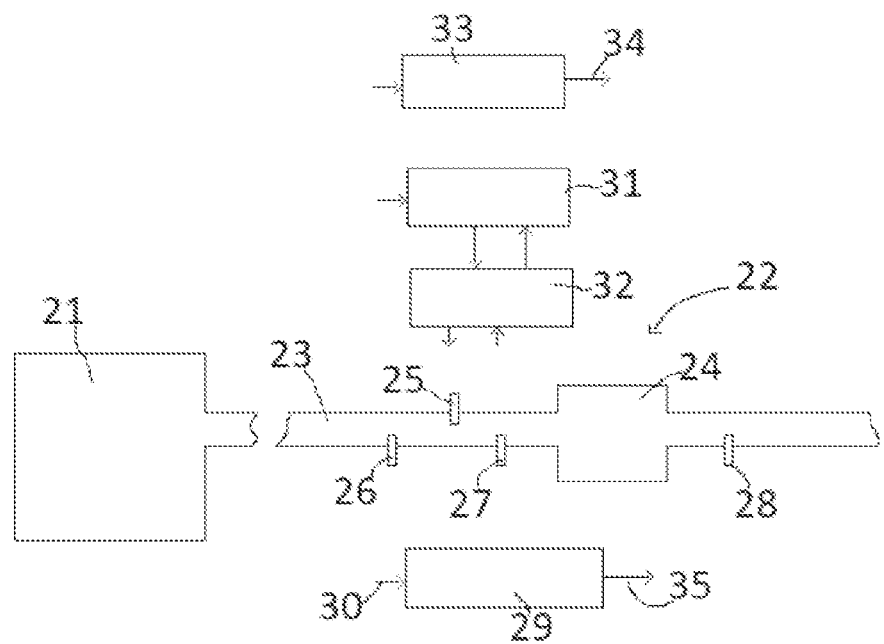
FIG. 2 shows an exhaust gas system and schematically illustrated different functions of the control unit.

FIG. 1 schematically shows a control unit 1 and a checking unit 2, which are connected to one another by means of a communication unit 3. The control unit 1 is used to control an exhaust gas system having a plurality of sensors and multiple catalytic converters, which are used to purify the exhaust gas of an internal combustion engine. The signals of the various sensors of the exhaust gas system or the internal combustion engine are provided to the control unit 1 by corresponding input signals 4. These input signals 4 can be both analog measured values and also digital measured values which are generated by corresponding digital sensors or further control units. The control unit 1 evaluates the signals of the sensors using an operating strategy 5 and calculates corresponding control signals, which control either the internal combustion engine or actuators of the exhaust gas system. In particular, the control unit 1 or the operating strategy 5 controls the injection of reducing agent into an exhaust gas system having an SCR catalytic converter, by which the reduction of NOX to form nitrogen and water is carried out. Details of such an SCR catalytic converter are also shown in FIG. 2. Furthermore, the control unit 1 also has a model 6, which calculates a model of the exhaust gas system or parts of the exhaust gas system from the measured values of the sensors.

A model thus generated can be used in particular for onboard diagnosis of the exhaust gas system. Examples of such models are explained in more detail for FIG. 2. In addition to the diagnosis of the proper function of the exhaust gas system, these model values can also be used for manipulation detection. For this purpose, the calculated values of the model 6 are encrypted by an encryption 7 and then passed on to the communication unit 3. Furthermore, the communication unit 3 partially or completely receives the measured sensor signals 4 and the actuator signals which were generated by the operating strategy 5. The communication unit 3 then transfers these encrypted model signals and the sensor and actuator signals to the checking unit 3. The received model signals are converted by a decryption 8 back into the original results of the models 6 and passed on to an evaluation 9. Furthermore, the evaluation 9 also receives the transferred sensor and actuator signals and checks whether these signals are plausible with respect to one another. As a result, the evaluation 9 then transmits a signal 10, which can have the status "manipulated" or "not manipulated".

In exhaust gas systems, in particular exhaust gas systems into which a reducing agent is injected, measures have to be taken to prevent a manipulation of the exhaust gas system. Transferring sensor values to an external checking unit 2, which then performs a plausibility check of the sensor values, has proven itself for detecting such a manipulation. A supposed operating capability of the exhaust gas system is to be simulated or the amount of reducing agent consumed is to be reduced by manipulations. In principle, such manipulations may be discovered by checking the plausibility of all measured values with respect to one another, if the correctness of the measured values can be guaranteed. Attackers who intend manipulation of an exhaust gas system in particular manipulate or simulate the measured values of individual sensors to simulate sufficient exhaust gas purification or a lower demand for reducing agent. However, since the measured values of the sensors of the exhaust gas system have to be made accessible to a plurality of other controllers in the vehicle, methods which ensure encryption or complex securing of the sensor values are difficult to implement. According to the disclosure, it is now proposed that models formed in the control unit be sent to an external checking unit in addition to the measured values of the sensors. Since such models do not have to be shared between different controllers, they can be encrypted much better than individual sensor values or simply kept secret. Furthermore, model values can take into consideration a plurality of sensor values, so that the effort for a manipulation is significantly increased.

The encrypted model values and the sensor and actuator signals are transferred to an external checking unit 2 by the communication unit 3. Such an external checking unit is, for example, a computer of a vehicle producer, which is connected by means of a radio connection to the communication unit 3. Such a computer of a checking unit 2 has an increased processing capacity as distinguished from a control unit 1 and in particular also the option of storing and examining a chronological sequence of measurement signals, actuator signals, and model values. The checking unit 2 can thus carry out complex examination methods, for example, frequency analyses by Fourier analyses, statistical methods, artificial intelligence, and correlations. A further advantage of the cloud evaluation is the fact that the result of the check cannot be kept secret in that, for example, the error memory of the vehicle is cyclically erased. It also means that the check can take place in a targeted manner (for example by the police) and those who are driving around with MIL (malfunction indicator light) lit up do not have to be identified first. Of course, these are all general advantages of the cloud evaluation.

FIG. 2 schematically shows an internal combustion engine 21 and an exhaust gas system 22. The exhaust gas system in particular has an exhaust gas pipe 23, which supplies the exhaust gas of the internal combustion engine 21 to an SCR catalytic converter 24. An injection valve 25 for the reducing agent is provided in the exhaust gas pipe before the SCR catalytic converter 24. Furthermore, a first NOx sensor 26 and a temperature sensor 27 are also arranged before the SCR catalytic converter 24. A second NOx sensor 28 is provided after the SCR catalytic converter. For reasons of simplified illustration, further components of the exhaust gas system, for example, a diesel oxidation catalytic converter possibly arranged before the SCR catalytic converter 24 or a turbocharger, are not shown. Furthermore, no connecting lines from the sensors to the corresponding function blocks are also shown.

Various functions or method steps of the method according to the disclosure are shown in FIG. 2. A model of the NOx emissions of the internal combustion engine is shown by 29. As input signals 30, this model of the NOx emissions receives, from sensors of the internal combustion engine, a supplied quantity of oxygen, a speed, a load, and an exhaust gas recirculation rate of the internal combustion engine. From these sensor values, the model 29 calculates a modeled NOx value 35 before the SCR catalytic converter 24. This modeled NOx value 35 can then be compared directly to the measured value of the sensor 26. Such a comparison can be carried out, for example, by an OBD function directly in the control unit 1 in order to detect malfunctions of the system in a timely manner. Furthermore, this modeled NOx value 35 and the measurement signal of the sensor 26 can be sent to the external checking unit 2, in order to judge therein whether the exhaust gas system 22 or the control unit 1 was manipulated.

A dosing strategy 31 receives, as input signals from the internal combustion engine, an exhaust gas mass flow and the measured values of the first NOx sensor 26, the temperature sensor 27, and the second NOx sensor 28. The dosing strategy 31 calculates therefrom a target quantity of reducing agent and gives it to the activation 32 of the injection valve 25. The activation 32 activates the injection valve 25 accordingly and measures the opening duration of the injection valve. An actual quantity of the injection valve 25 is then ascertained from the measured opening duration and returned to the dosing strategy 31.

Furthermore, a model 33 for the SCR catalytic converter is also provided. This model 33 receives as input signals the measured values of the sensors 26 and 27, the exhaust gas mass flow, and the actual quantity of the injection valve 25, as was ascertained by the activation 32. From these values, the model 33 of the SCR catalytic converter 24 ascertains a model value 34 for the NOx emissions after the SCR catalytic converter 24. The model value 34 and the measurement signal of the sensor 28 can then again be used for an OBD function inside the control unit 1 or for manipulation detection in the checking unit 2. For the purpose of manipulation detection, the checking unit 2 will typically evaluate the time curve, since the time curve is much more complex to manipulate than individual measured values. Corresponding checks are explained in more detail in FIGS. 3 and 4.

A large number of model values can be used by the checking unit 2 for the purpose of manipulation detection. Various temperatures can be considered as models. For example, a temperature at the engine outlet, after a turbocharger, or in different catalytic converters or filters of the exhaust gas system can be observed. In addition to the NOx value, a residual content of reducing agent at various points in the exhaust gas flow can also be modeled. Furthermore, the oxygen value can be modeled and measured at various points of the exhaust gas system 22.

Model values which are generated by the control unit 1 in any case for the purpose of OBD diagnosis are particularly suitable for the transfer to the checking unit 2. Such model values are already provided for an internal diagnosis in the control unit 1 and are typically not communicated to other control units in a vehicle, however. It is therefore particularly simple to encrypt these model values, since no other control unit of the vehicle requires these values. Decryption only in the checking unit 2 is therefore sufficient.

Sufficiently reliable model values, which are suitable for the purpose of internal diagnosis in the control unit 1 or for detection of a manipulation in the external checking unit 2, are not ascertained in all operating ranges. In addition to the actual model values, it is therefore reasonable to transfer information with respect to the reliability of the model values. It can thus be ensured that only sufficiently reliable model values are used for the manipulation detection in the checking unit 2.

In addition to the model values, intermediate values can also be sent to the checking unit 2, which were used to form the model values. The degree of detail of the manipulation detection can thus be improved.

Furthermore, it can be provided that the model values are sent to the external checking unit 2 only at certain points in time or in dependence on events. These measures can be used alternatively or additionally to an encryption of the model values. If an attacker who intends to manipulate the exhaust gas system 22 does not know the algorithm by which the points in time are determined or the precise dependencies on events, manipulation of the exhaust gas system 22 is made more difficult for him.

A further obstruction of a manipulation of the exhaust gas system 22 can take place in that from time to time the external checking unit 2 sends new instructions to the control unit 1 as to which model values are to be sent or how these model values are formed. An attacker who wishes to manipulate the exhaust gas system 22 also first would have to ascertain here by time-consuming observation of the system how this procedure can possibly be manipulated. As a further alternative, the checking unit 2 or the control unit 1 can perform an active intervention in the exhaust gas system 22 from time to time and transmit the reactions of the exhaust gas system 22 then taking place to the checking unit 2. Such an active intervention consists of an intentional short-term worsening of the exhaust gas system 22 and the measurement as to whether this worsening actually occurs to the provided extent. These measures, which only occur rarely, also first have to be complexly identified by a potential attacker.

In FIG. 3, the time curve of the modeled NOx concentration 35 before the catalytic converter 24 and the curve of the measured NOx concentration of the sensor 26 before the catalytic converter 24 are shown in the time curve. In the upper diagram, the modeled value 35 and the measured value 26 of the NOx concentration are shown. The modeled value 35 is additionally provided with reliability information in that in the regions in which the value cannot be reliably modeled, the value 35 is set to the value −1. In the time interval from the point in time t1 to the point in time t2, the modeled value 35 can be reliably modeled and accordingly the modeled NOx value 35 displays positive values. A comparison to the measured value of the sensor 26 shows good correspondence in this time interval t1-t2, which is interpreted by the checking unit 2 to mean that the exhaust gas system 22 was not manipulated. The evaluation of the time curve of the modeled value 35 and the measured value 26 can be carried out particularly simply by the formation of time integrals of the NOx concentration in the interval t1-t2, as is shown in the lower part of FIG. 3. The integral of the modeled quantity is shown by the curve 52 and the integral of the measured quantity by the curve 53. At the point in time t1, the integration of both the modeled value 35 and also the measured value 26 is started and continued until the point in time t2. To ensure that sufficiently large NOx values are provided, it is compared whether the two NOx integral values 52, 53 exceed a threshold value 51. Since this is the case, the two integral values 52 and 53 can be compared to one another. If the difference is excessively large, a "manipulated" exhaust gas system is established. If the difference is small, a "non-manipulated" exhaust gas system is established. In addition to a single sufficiently long phase of the validity of the modeled NOx value 35, multiple successive phases can also be integrated together until a sufficiently high threshold is reached.

In FIG. 4, the modeled NOx concentration 34 and the measured NOx concentration 28 after the SCR catalytic converter 22 are each shown in relation to the time t. The curve in FIG. 2 is typical for an exhaust gas system 22 having a single SCR catalytic converter or a system having two SCR catalytic converters after the first SCR catalytic converter. The evaluation is carried out on the basis of the chronological position of the maximum value (detection of the peak) of the modeled NOx value 34 and the measured NOx value 28, i.e., in each case the chronological location of the maximum is observed. In a first time window t1 to t2, a first maximum is detected and in a second time window t3 to t4, a second maximum is detected. By evaluating the chronological location of the respective maximum, the checking unit can detect whether the exhaust gas system 22 was manipulated.

What is claimed is:

1. A method for detecting a manipulation of an exhaust gas system, comprising:
    forming model values in a control unit of the exhaust gas system, the model values at least partially formed from measured values;
    sending the formed model values to an external checking unit using the control unit;
    sending the measured values to the external checking unit using the control unit;
    evaluating the exhaust gas system as manipulated or as not manipulated based on the sent model values and the sent measured values using the external checking unit; and
    carrying out an active intervention in the exhaust gas system using the control unit or the external checking unit, the active intervention triggering a predetermined reaction upon the model value sent to the external checking unit when the exhaust gas system is evaluated as not manipulated.

2. The method according to claim 1, further comprising:
    using the model values in the control unit for a diagnosis of a functionality of the exhaust gas system.

3. The method according to claim 1, further comprising:
    sending items of information based on a reliability of the model values to the external checking unit using the control unit.

4. The method according to claim 1, further comprising:
    sending items of information based on intermediate values which were used to form the model values to the external checking unit using the control unit.

5. The method according to claim 1, further comprising:
    encrypting the model values before sending the model values.

6. The method according to claim 1, wherein the model values are sent to the external checking unit at predetermined points in time or in dependence on events.

7. The method according to claim 1, further comprising:
sending an instruction from the external checking unit to the control unit indicating how the model values are to be formed.

* * * * *